Figure 1:
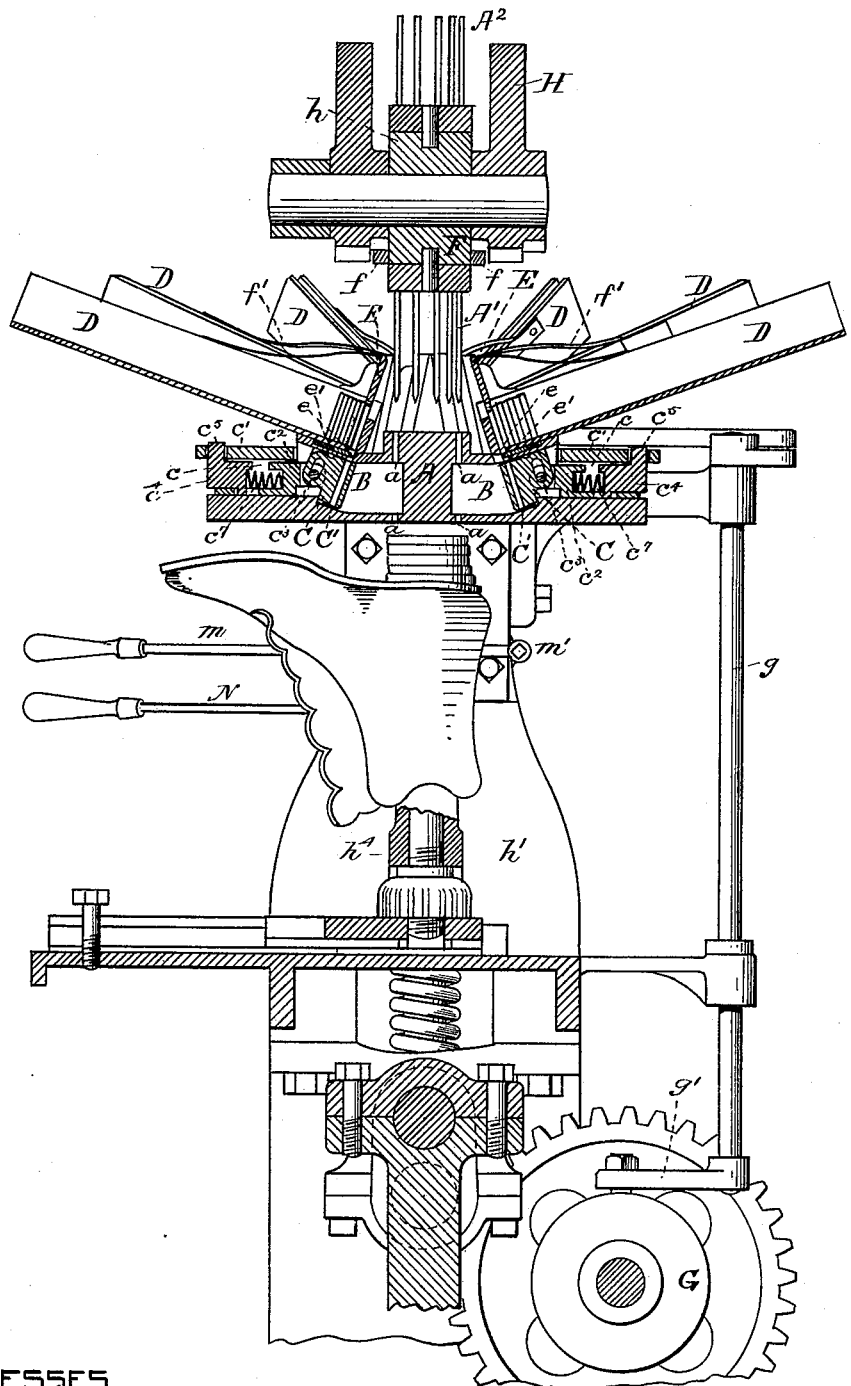

(No Model.)  3 Sheets—Sheet 3.

F. F. RAYMOND, 2d.
NAILING MACHINE.

No. 326,781. Patented Sept. 22, 1885.

WITNESSES
J. M. Dolan.
Fred. B. Dolan.

INVENTOR
F. F. Raymond

UNITED STATES PATENT OFFICE.

FREEBORN F. RAYMOND, 2D, OF NEWTON, MASSACHUSETTS.

NAILING-MACHINE.

SPECIFICATION forming part of Letters Patent No. 326,781, dated September 22, 1885.

Application filed June 29, 1885. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nailing-Machines, of which the following is a full, clear, and exact description, reference being had to the accompanying drawings, forming a part of this specification, in explaining its nature.

The invention is shown as applied to a heel-nailing machine, and it relates especially to means for automatically feeding heel-attaching nails to the nail-driving devices, and in the drawings I have represented the invention as embodied in a machine having many of the characteristics of the National heeling-machine.

The invention consists of a templet having holes in which the awls and drivers are successively reciprocated, and to which holes the attaching-nails are fed by nail-carrier blocks adapted to receive the nails automatically and to transfer them to a position to be driven by the drivers.

Figure 2:
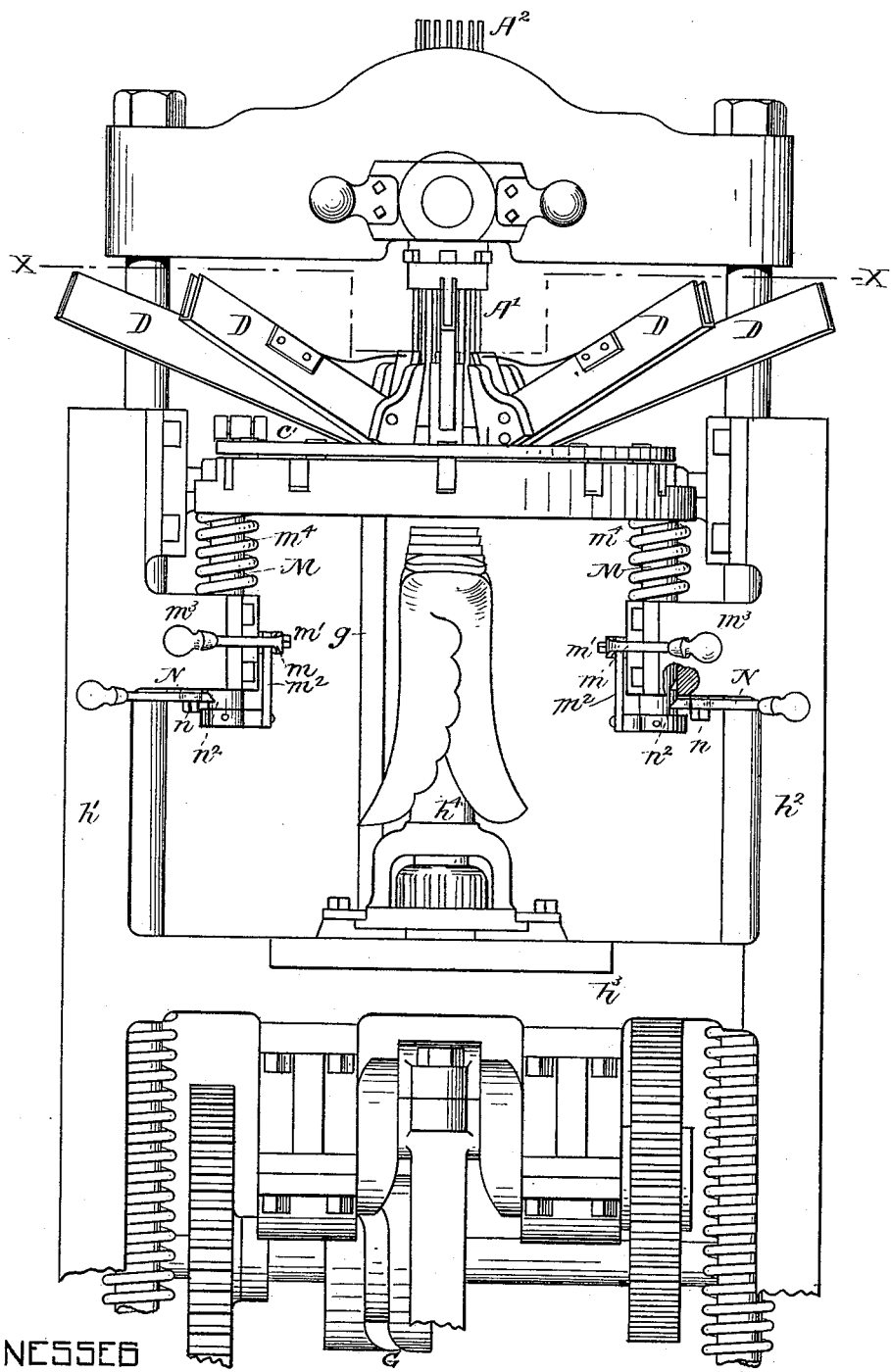
Figure 3:
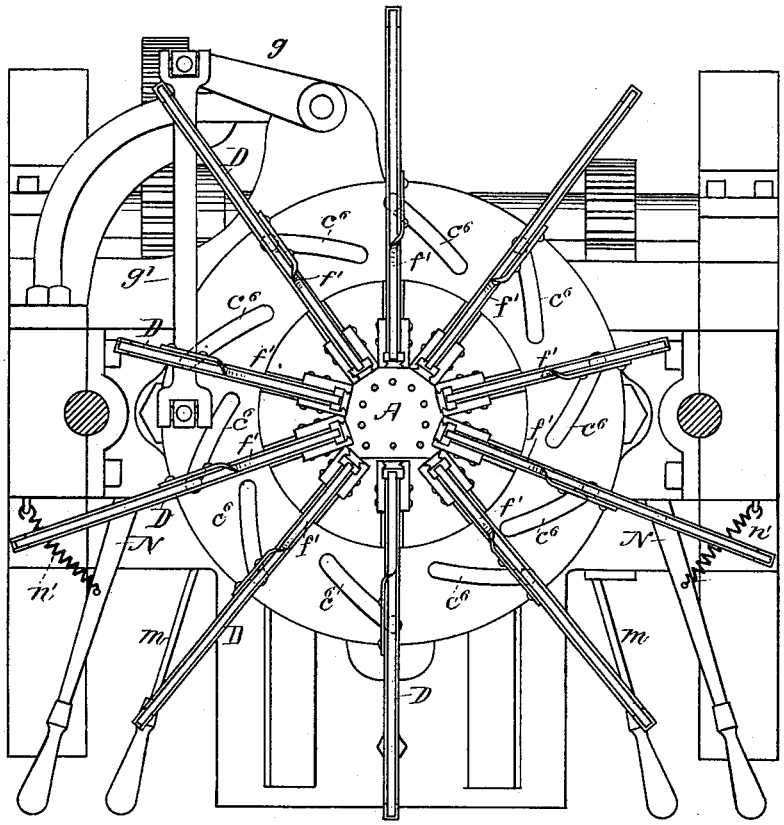
Figures 4, 5:
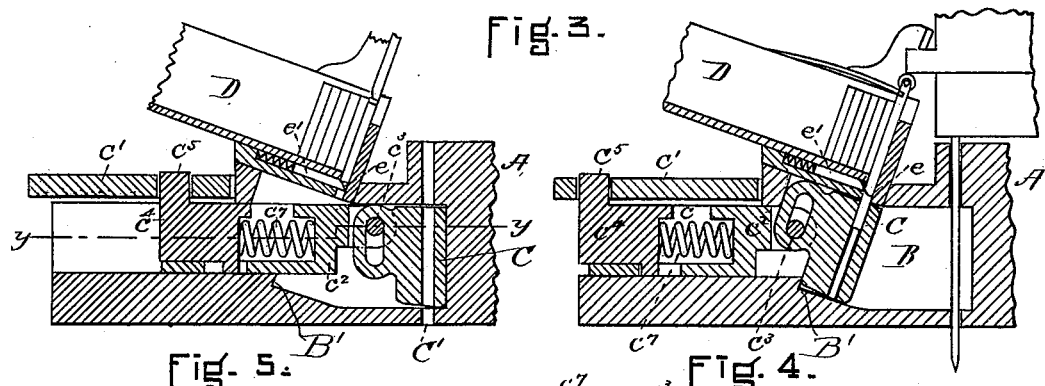
Figure 6:
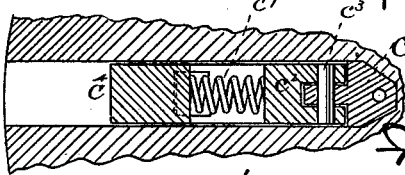

Referring to the drawings, Figure 1 is a view, part in vertical central section, showing portions of the machine in elevation. Fig. 2 is a front elevation of the central and upper parts or sections of the machine. Fig. 3 is a section upon the line $x\ x$ of Fig. 2, and a plan below said line. Figs. 4, 5, and 6 are detail views hereinafter referred to.

A is the templet block or plate. It has the holes $a$, in which the awls A' and the drivers A² are successively reciprocated. The plate is cut out, preferably as represented at B in Fig. 1, to provide a space into which the nail-carriers, hereinafter described, may be moved, and the holes $a$ open into this space. The nail-carriers C are adapted to be moved into this space to feed the nails to a position to be driven by the drivers, and when the carriers are in position the holes C', for receiving and holding the nails, form continuations of the holes $a$ in the templet. (See Fig. 4.)

In Fig. 1, C represents the carriers. There may be a separate carrier-block for each hole of the templet-plate, or they may be arranged in groups of two or more, and I prefer the latter arrangement. There is formed in each of the carrier-blocks the hole C', which, when the block has been moved into position, forms a continuation of one of the holes of the templet-plate. The carrier-blocks preferably are moved in the ways or passages $c$ by means of the cam-ring $c'$, and the connecting devices comprising the blocks $c^2$, to which the carrier-blocks are respectively pivoted at $c^3$, and the connecting-blocks $c^4$, which are carried by the blocks $c^2$, and which have pins $c^5$, entering the eccentric slots $c^6$ in the cam-ring $c'$. Between the end of each block $c^4$ and its block $c^2$ there is arranged the spring take-up $c^7$, for purposes hereinafter specified. Where loose nails are used, I prefer to guide the carrier-blocks so that upon their outward movement they will be inclined, as shown in Fig. 1, as when so inclined their holes are in a better position to receive the nails from the chutes D. Each hole has a separate chute or conductor, and these conductors extend outwardly and upwardly from the templet-plate, as represented in Figs. 1, 2, and 3, and are adapted to hold a large quantity of headed or unheaded nails arranged in regular order for driving. They are fed from the chute into the holes in the carrier-block by means of the plungers or strippers E, which are moved across the lower end of the chutes to discharge the nails in succession therefrom into the holes of the carrier-blocks. The outlet $e$ of each chute is only large enough to permit the passage of one nail at a time, and this passage is closed by a spring-plate, $e'$, when the stripper or discharging device is not in operation.

I prefer to move the dischargers E downward by the projections $f$ from the awl-block F upon the descent of the awl-block in driving the awls, and upon the upward movement of the awl-blocks the dischargers are returned automatically to their original position by the springs $f'$. This provides each hole of the nail-carrier blocks with a nail. The cam-disk is revolved immediately after the awls have left the templet-plate upon their upward movement by means of the cam G, levers and rod $g$, and connecting-rod $g'$, which partially revolves the cam-disk sufficiently to throw the carrier-blocks forward and bring their holes in line with the holes $a$ of the templet.

H is the cross-head, supporting a revolving head, $h$, which is represented as provided with two arms—one for holding the awls and the other for holding the drivers.

$h'$ is one of the side frames of the machine, and $h^2$ the other; $h^3$, the bed; $h^4$, the sliding jack which supports the last or heel-support. The templet-plate A is represented as supported by the rods M, and is movable vertically by the levers $m$, which are pivoted at $m'$ and connected with the rods M at $m^2$. These rods M have bearings or supports in projections $m^3$, extending horizontally inward from the side frames of the machine, and the templet plate or block is locked in its lowest position by means of the horizontally-moving latches N, which are pivoted at $n$, and are moved automatically by the springs $n'$ into notches $n^2$ in the rods M when the same have been depressed or moved downward sufficiently to bring the notches in position to receive the latches. The templet is returned to its original position upon the movement of the latches to release the rods by the springs $m^4$. It will be seen that each block $c^2$ has a slot or recess which receives a pin projecting downward from the block $c^4$, and that upon the outward movement of the block $c^4$ these pins move in the slots until they reach the end thereof, and then serve as the connections with the blocks $c^2$, whereby the carriers C are moved out into position to receive the nails. The inward movement of the carriers C is limited by the contact of their forward or front surfaces with the walls which form the ends of the recesses B, and the outward movement is restricted by the stops B'. By this means the holes in the carriers are always brought into perfect register either with the templet-hole $a$ or with the throat $e$. The upper part of the holes C' of the carriers may be somewhat larger than the holes $a$, and especially if the portion of the templet below the recess B is made quite thick, so that the nails may leave the carrier-blocks C and enter said holes and the holes previously formed in the heel by the awls, and thereby be held in a proper vertical position for driving.

In operation the operator or attendant, if the chutes D are used for supplying the carriers C with nails, fills them with the style and size of fastenings desired, which may consist of any of the ordinary fastenings of the market, headed or unheaded, and the chutes are of a width to receive the nails in stack—that is, in a single line and of any desired number, according to the length of the chutes—and the chutes are of sufficient inclination to feed the nails by gravity to the strippers. As I have before intimated, however, I do not confine myself to this means of providing the carrier-blocks with fastenings, as I may use in lieu thereof any of the devices shown and described in any of my various patents relating to this subject, and described in pending applications. The work is then moved into position, with the heel below the holes of the templet block or plate, and the templet block or plate, with the nail-feeding devices attached thereto, is moved downward thereon. The machine is then started, and a reciprocation of the awls forms holes in the heel-blank, and moves the plungers or strippers E downward, thereby transferring the nails from the chutes to the carriers C, which are in position to receive them. Upon the upward movement of the awls the carrier-blocks are moved by the cam simultaneously from beneath the throats of the nail-feeding devices to bring the nails in line with the holes $a$ of the templet. The drivers are brought into position, and the next reciprocation of the machine drives the nails from the templet into and through the heel, attaching it to the sole of the boot or shoe. The carrier-blocks are then withdrawn to a position to again receive nails from the nail-feeding devices; and when the templet-plate below the recesses B is sufficiently thick to receive nails the carrier-blocks may be withdrawn before the nails are driven; but this, of course, can only take place when the length of the holes below the blocks is sufficient to receive the nails therefrom, and thereby allow the withdrawal of the blocks. It will be seen that where nails are fed by chutes it is necessary to turn the nail-carriers as they are moved from a position which allows them to deliver nails vertically to an inclined position, which inclines their nail-receiving holes and brings them in line with the inclination of the nails, ready for delivery; but of course where the nail-feeding devices are not chutes there is no necessity for so changing the inclination of the carriage.

By making the connection between the blocks $c^4$ and the blocks $C^2$ a yielding one it will be seen that a nice construction and movement of the cam-plate is not necessary, and that the cam-plate can always be moved sufficiently to insure the bringing of the nail-carrier blocks into proper position. The drivers are then immediately reciprocated and the nails driven, and as soon as the drivers have been withdrawn from the templet the nail-carrier blocks are withdrawn by the reverse movement of the cam-plate to a position to again receive the attaching-nails for the next heel. Of course the nail-carrier blocks may be used to receive nails delivered from any other source than the chutes D.

I do not confine myself to the especial relation which the nail-carrier blocks bear to the templet, but may change or vary their location without departing from the spirit of the invention.

Having thus fully described my invention, I claim and desire to secure by Letters Patent of the United States—

1. The templet A, having the holes $a$, and the independent nail-carrier blocks C, for feeding or transferring nails to the templet-holes, all substantially as and for the purposes described.

2. The combination of the templet-block having holes $a$, the independent nail-carrier blocks having holes C', and means for moving them into and out of operative position with the holes a of the templet, all substantially as and for the purposes described.

3. The combination of the templet having the holes a, the passages B, the movable independent nail-carrier blocks C, and means for moving the same in said passages, all substantially as and for the purposes described.

4. The combination of the templet A, the independent nail-carrier blocks C, and devices for automatically feeding nails to the nail-receiving holes of said blocks, all substantially as and for the purposes described.

5. The combination of the templet A, having holes a, the nail-carrier blocks C, the chutes D, and devices for feeding nails from the chutes in successive order to the nail-carriers, all substantially as and for the purposes described.

6. The combination of the templet A, having the holes a, the nail-carriers C, having the holes C', the chutes D, having the dischargers E, and the reciprocating gang of awls A', having the arms f, for operating the dischargers, all substantially as and for the purposes described.

7. The combination of the templet A, the nail-carriers C, the cam-ring c', having the eccentric cam-slots $c^6$, each of which is connected with a nail-carrier block, and means for reciprocating the cam-disk, all substantially as and for the purposes described.

8. The combination, in a heel-nailing machine, of a templet and independent nail-transferring devices for automatically feeding nails laterally through holes or recesses therein to a position to be driven by the drivers, all substantially as and for the purposes described.

9. The combination of the templet A, having the holes a, with the horizontally-movable carriers C and stops for limiting the extent of their movements, all substantially as and for the purposes described.

10. The combination of the templet A, having the holes a, and the carriers C, and means for varying their inclination for the purpose of changing the inclination of the nail-receiving holes therein, all substantially as and for the purposes described.

11. The combination of the templet A, having the holes a, a series of converging chutes for holding the nails and automatically delivering them to the templet-holes, supported by said templet, and means for moving the templet and said devices vertically, all substantially as and for the purposes described.

FREEBORN F. RAYMOND, 2D.

Witnesses.
BOWDOIN S. PARKER,
FRED. B. DOLAN.